(12) United States Patent
Roggendorf

(10) Patent No.: US 11,204,884 B1
(45) Date of Patent: Dec. 21, 2021

(54) ADAPTER FOR SYNTHETIC OR REDUNDANT REMOTE TERMINALS ON SINGLE 1553 BUS

(71) Applicant: Rockwell Collins, Inc., Cedar Rapids, IA (US)

(72) Inventor: Brian R. Roggendorf, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 13 days.

(21) Appl. No.: 16/439,968

(22) Filed: Jun. 13, 2019

(51) Int. Cl.
*G06F 11/20* (2006.01)
*G06F 13/20* (2006.01)
*G09B 9/08* (2006.01)
*G06F 13/40* (2006.01)

(52) U.S. Cl.
CPC .......... *G06F 13/20* (2013.01); *G06F 13/4027* (2013.01); *G09B 9/08* (2013.01)

(58) Field of Classification Search
None
See application file for complete search history.

(56) References Cited

U.S. PATENT DOCUMENTS

| 6,047,222 | A * | 4/2000 | Burns | G05B 19/4184 |
| | | | | 700/79 |
| 6,754,762 | B1 * | 6/2004 | Curley | G06F 11/2007 |
| | | | | 710/316 |
| 2003/0035369 | A1 * | 2/2003 | Hayashi | H04L 12/403 |
| | | | | 370/216 |
| 2006/0101184 | A1 * | 5/2006 | Hegarty | G06F 11/2012 |
| | | | | 710/307 |
| 2007/0211730 | A1 * | 9/2007 | Cuthbert | H04L 12/4641 |
| | | | | 370/395.53 |
| 2007/0268973 | A1 * | 11/2007 | Fanson | H04L 12/403 |
| | | | | 375/257 |
| 2014/0237156 | A1 * | 8/2014 | Regula | G06F 13/4027 |
| | | | | 710/314 |
| 2015/0082975 | A1 * | 3/2015 | Huber | F42C 17/04 |
| | | | | 89/1.11 |
| 2015/0370752 | A1 * | 12/2015 | Hammel | G06F 13/4282 |
| | | | | 710/105 |
| 2016/0056905 | A1 * | 2/2016 | Hartlmueller | H04J 3/0697 |
| | | | | 375/354 |

(Continued)

OTHER PUBLICATIONS

"How Single, Dual, and Four-Channel 1553 Make the Standard More Versatile", Excalibur Systems (Year: 2018).*

*Primary Examiner* — Hyun Nam
(74) *Attorney, Agent, or Firm* — Suiter Swantz pc llo

(57) ABSTRACT

A remote terminal adapter device is disclosed. The adapter device includes control processors in communication with a bus controller via a dual redundant data bus (e.g., MIL-STD-1553) having primary and secondary data buses or channels. The adapter device includes analog relays connecting the primary and secondary buses to a main remote terminal (RT) device configured for control of an aircraft subsystem. Additional analog relays connect the data bus to one or more auxiliary or additional RTs (e.g., configured to backup the main RT or simulate the controlled subsystem and its responses. The adapter device may monitor the data bus for traffic and allow the redundant RT to access the data bus (from the same remote terminal) address as the main RT by activating and deactivating the analog relays.

14 Claims, 4 Drawing Sheets

(56) References Cited

U.S. PATENT DOCUMENTS

| | | | |
|---|---|---|---|
| 2016/0162422 A1* | 6/2016 | Weber | G06F 12/0897 |
| | | | 710/308 |
| 2016/0179731 A1* | 6/2016 | Fanson | H04L 12/40189 |
| | | | 710/306 |
| 2016/0239371 A1* | 8/2016 | Jose | G06F 11/079 |
| 2018/0285309 A1* | 10/2018 | Prentice | G06F 13/4022 |
| 2018/0367553 A1* | 12/2018 | Hayden | G06F 21/552 |
| 2019/0016443 A1* | 1/2019 | Alfred | G05D 1/0077 |
| 2019/0385057 A1* | 12/2019 | Litichever | G06N 3/08 |

\* cited by examiner

ADAPTER FOR SYNTHETIC OR REDUNDANT REMOTE TERMINALS ON SINGLE 1553 BUS

BACKGROUND

Live, virtual, and constructive (LVC) training for military aircraft pilots may provide for the simulation of other aircraft (e.g., proximate or opposing aircraft) as well as onboard sensors and other aircraft subsystems in order to provide the most realistic possible training experience. LVC platforms, and other airborne, ground-based, and maritime platforms (e.g., training, operations, recovery) may incorporate a central mission computer (e.g., bus controller) interfacing with remote terminals via a MIL-STD-1553 data bus, each remote terminal (RT; e.g., peripheral device) controlling one or more subsystems. Additional RTs may be incorporated to simulate a subsystem or its activities, the RTs generating status or data messages as though they were the subsystems they purport to simulate. However, each additional RT would require a distinct remote terminal address; the bus controller would need to be aware of the transition from an actual RT to a simulating RT and communicate with the simulating RT rather than the actual RT. Otherwise, if the actual RT and its simulator had the same RT address, messages from the two (or more) subsystems would interfere with each other.

SUMMARY

A remote terminal adapter device is disclosed. In embodiments, the adapter device includes control processors in communication with a bus controller via a dual redundant data bus (e.g., MIL-STD-1553) having primary and secondary data buses or channels. The adapter device includes analog relays connecting the primary and secondary buses to a main remote terminal (RT) device configured for control of a platform subsystem (e.g., for an airborne, ground-based, or maritime mobile platform). Additional analog relays connect the data bus to one or more auxiliary or additional RTs (e.g., configured to backup the main RT or simulate the controlled subsystem and its responses. The adapter device may monitor the data bus for traffic and allow the redundant RT to access the data bus (from the same remote terminal) address as the main RT by activating and deactivating the analog relays.

A live, virtual, and constructive (LVC) training platform is also disclosed. In embodiments, the LVC training platform includes a bus controller (mission computer) in communication with one or more remote terminal (RT) devices via a dual redundant data bus (e.g., MIL-STD-1553) incorporating at least a primary and secondary bus. Each RT device may be associated with one or more redundant RT devices, the redundant RTs serving as backup systems or as simulators of the mobile platform subsystems controlled by the corresponding RT device. Each RT device and its associated redundant RTs are in communication with the data bus via an adapter device controlling communication between the data bus and the RT devices through analog relays. The adapter device may monitor data bus traffic and allow a redundant RT to communicate with the bus controller by closing the relays to the main RT and opening the relays to the redundant RT. In this way the bus controller may communicate with the main RT and its multiple redundant RTs as though the main RT and its redundant RTs were a single device having a single address, without modifying the bus controller itself or its software.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
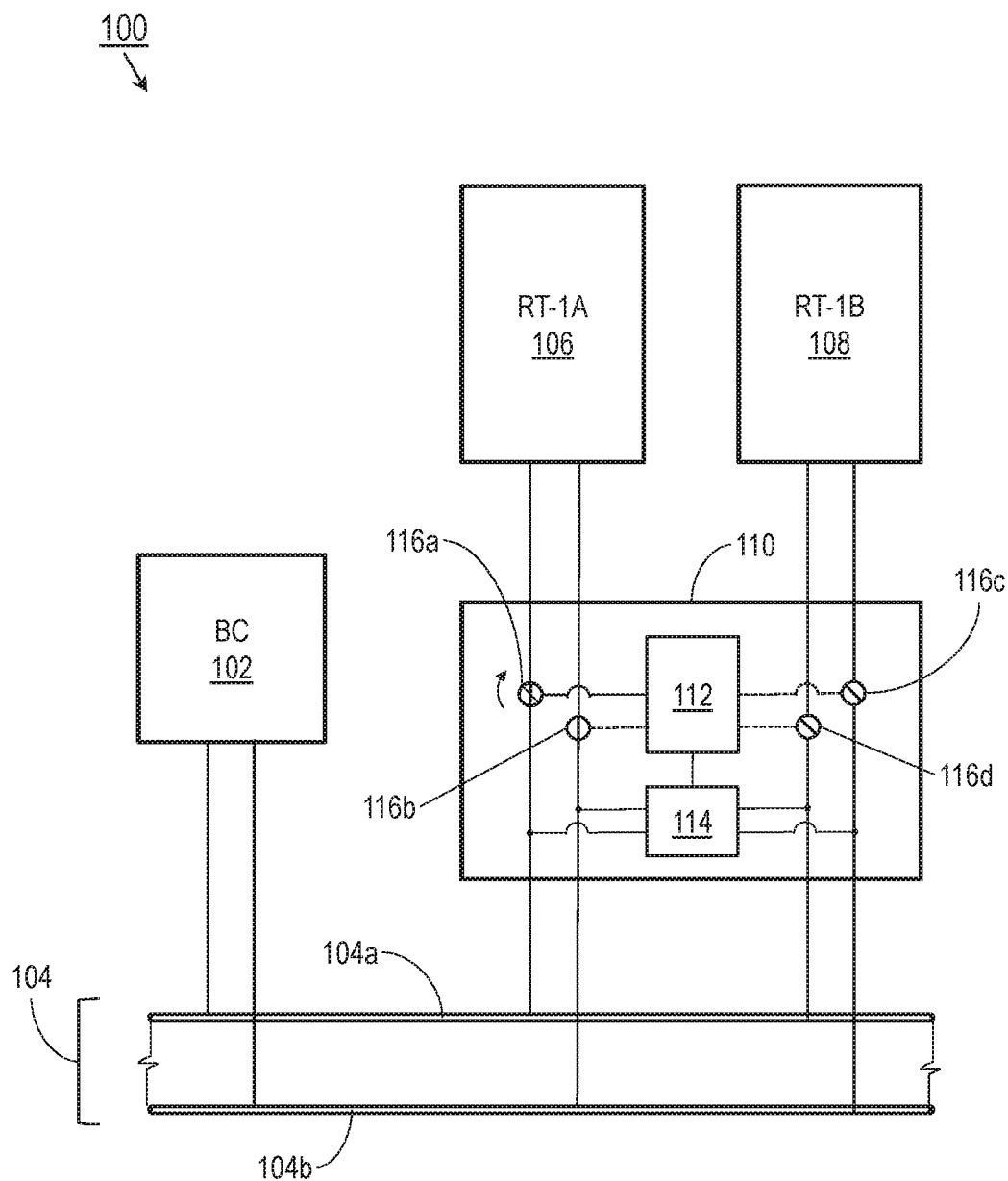
FIG. 1 is a block diagram illustrating an LVC training platform in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a"

and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Embodiments of the inventive concepts disclosed herein are directed to a semaphore adapter device configured for connecting a remote terminal and one or more associated redundant remote terminals to a bus controller via a MIL-STD-1553 data bus without modifying the bus controller, the remote terminals, or any cabling or wiring aboard the embodying aircraft. The adapter device allows redundant RTs to seamlessly simulate (or take over for) an associated RT without the need for additional address allocation.

Referring to FIG. 1, an LVC training system 100 is disclosed. In embodiments, the LVC training system 100 may be implemented aboard an aircraft, or the system may be implemented in a ground-based training facility and configured to simulate a realistic flight training experience. The LVC training system 100 may incorporate a bus controller 102, a dual redundant data bus 104 (e.g., MIL-STD-1553 data bus), a main or primary remote terminal 106 (RT), one or more redundant or secondary RTs 108, and a semaphore adapter device 110. In some embodiments, the LVC training system 100 may include any appropriate type of platform configuration incorporating primary and secondary remote terminals, including airborne (avionics), ground-based, and maritime mobile platforms.

In embodiments, the dual redundant data bus 104 may include a primary bus 104a and a secondary bus 104b (e.g., primary data channel, secondary data channel) incorporating redundant bus methods as detailed, for example, by MIL-STD-1553. For example, the bus controller 102 may initiate communications to the main RT 106 via the primary bus 104a. If the main RT 106 fails to respond via the primary bus 104a, the bus controller may repeat its request via the secondary bus 104b. In some embodiments, the data bus 104 may include additional redundant buses (e.g., tertiary, quaternary) as needed.

Each main RT 106 may be associated with a particular remote terminal address and one or more aircraft subsystems controlled by the main RT (e.g., radar, navigation, communications, sensor subsystems). In response to requests from the bus controller 102 (e.g., status or data requests), the main RT 106 may provide status updates or subsystem data to the bus controller. Each main RT 106 may be associated with one or more redundant RTs 108, the main RT and its associated redundant RTs connected to the data bus 104 by a single adapter device 110. A redundant RT 108 may be configured for simulation of the aircraft subsystem controlled by the main RT 106, or activities or behaviors of the controlled subsystem. For example, a main RT 106 may be configured for control of a surveillance radar subsystem, and the associated redundant RT 108 may generate simulated surveillance radar responses dictated by a particular LVC training scenario but not corresponding to tangible aircraft or other objects detectable by the surveillance radar subsystem. Additionally, or alternatively, the redundant RT 108 may be configured to replace, backup, or recover for an associated main RT 106, e.g., should the main RT fail.

In embodiments, the adapter device 110 may include one or more control processors 112, a MIL-STD-1553 monitor terminal 114 (MT), and analog relays 116a-d (e.g., switches) controlling access to the data bus 104 by the main RT 106 and its associated redundant RTs 108. For example, the MT 114 may monitor the data bus 104 to identify message requests to the main RT 106 via either the primary bus 104a or the secondary bus 104b. Under nominal conditions, the adapter device 110 may facilitate communication between the bus controller 102 and the main RT 106 via the primary data bus 104a by keeping the relay 116a closed (e.g., active). Data or status requests from the bus controller 102 (e.g., command words, status words) may reach the main RT 106 via the primary bus 104a (e.g., through the open relay 116a), and the main RT may send the appropriate responses (e.g., subsystem data, status updates) back to the bus controller via the primary bus 104a. Simultaneously, the adapter device 110 may keep the relays 116b-d open or inactive, such that the redundant RT 108 is disconnected from the primary bus 104a and both the redundant RT and the main RT 106 are disconnected from the secondary bus 104b.

In embodiments, the adapter device 110 may disconnect the main RT 106 from the data bus 104, either entirely or on a message-by-message basis, based on traffic over the data bus 104 monitored by the MT 114. For example, the adapter device 110 may open (deactivate) the relay 116a and close (activate) the relay 116c, disconnecting the main RT 106 from the primary bus 104a in favor of the redundant RT 108. In this way, the redundant RT 108 may respond to data or status requests from the bus controller 102 (e.g., including requests intended for the main RT 106) via the primary bus 104a. Similarly, messages sent via the data bus 104 and monitored by the MT 114 may include instructions or conditions under which the main RT 106 may be disconnected from the primary bus 104a in favor of a redundant RT 108. Management of the relays 116a-d by the control processor 112 of the adapter device 110 may allow the bus controller 102 to communicate with the main RT 106 or any associated redundant RTs 108 via a single remote terminal address, without the bus controller being aware of any distinction between the main RT and any redundant RTs sharing that remote terminal address.

In embodiments, the adapter device 110 may inhibit transmissions by the main RT 106 via the primary bus 104a on a cyclic or periodic basis. For example, in the absence of other instructions or conditions transmitted via the data bus 104 to provide guidance to the adapter device 110, the adapter device may periodically open/deactivate the relay 116a, disconnecting the main RT 106 from the primary bus 104a. The redundant RT 108 may anticipate this behavior and use these periodic disconnections as an opportunity to "take over" the primary bus 104a, e.g., for transmission of simulated subsystem data and/or status messages. The redundant RT 108 may or may not be aware of the activities or transmissions of the main RT 106 (e.g., depending on the configuration or programming of the LVC training system 100), so these activities or transmissions may or may not contribute to a takeover by the redundant RT 108. In the event of a takeover by the redundant RT 108, the adapter device 110 may continue to inhibit transmissions by the main RT 106, keeping the relay 116a open/inactive and the relay 116c closed/active.

In the event that the redundant RT 108 does not intend to take over control of the primary bus 104*a* and transmit thereby, the bus controller 102 may retry its most recent request via the secondary bus 104*b*. The adapter device 110 may notice this shift to the secondary bus 104*b* via the MT 114 and close/activate the relay 116*b*, connecting the main RT 106 to the secondary bus so that the main RT may transmit a response to the received request thereby. The bus controller 102 may subsequently transfer back to the primary bus 104*a* for continued operations.

In some embodiments, the adapter device 110 may similarly disconnect the redundant RT 108 from the primary bus 104*a* by opening/deactivating the relay 116*c* on a cyclic or periodic basis, which the main RT 106 may use as an opportunity to similarly take over the connection to the primary bus 104*a*. The adapter device 110 may respond accordingly by reclosing/reactivating the relay 116*a* for transmissions by the main RT 106.

Figure 2:
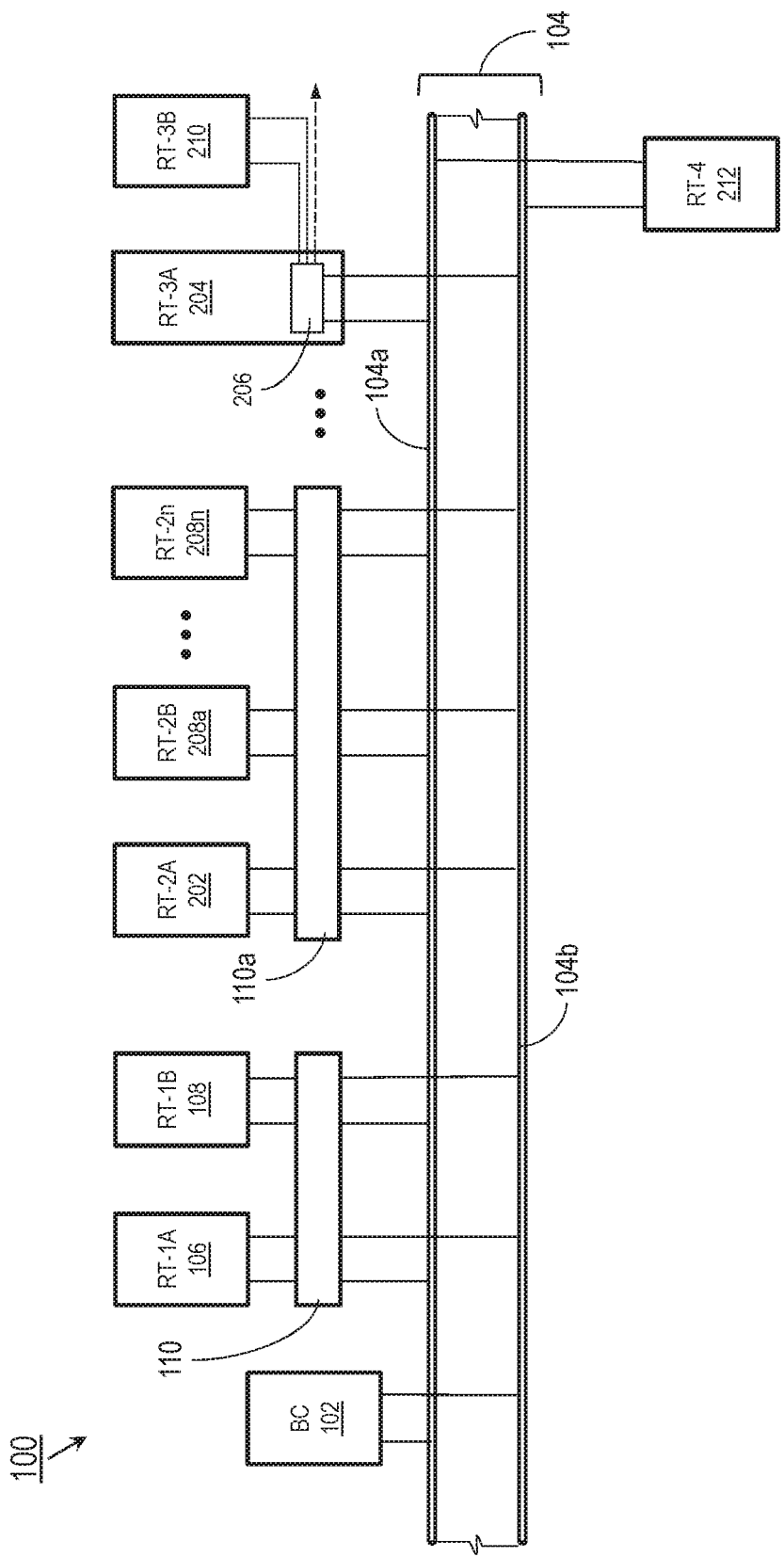
FIG. 2 is a block diagram illustrating the LVC training platform of FIG. 1.

Referring to FIG. 2, the LVC training system 100 is shown. In embodiments, the LVC training system may include multiple main RTs 106, 202, 204, each main RT respectively connected to the data bus 104 (e.g., to the primary bus 104*a* and the secondary bus 104*b*) by an adapter device 110, 110*a*, 206. For example, the adapter device 110*a* may be implemented and may function similarly to the adapter device 110, except that the adapter device 110*a* may manage communications with the bus controller 102 (via the data bus 104) by the main RT 202 and multiple associated redundant RTs 208*a* . . . 208*n*. For example, the multiple redundant RTs 208*a-n* may include multiple backups for the subsystem or subsystems controlled by the main RT 202 or simulations of the controlled subsystems under different sets of parameters. The adapter device 110*a* may, via control of its internal relays (116*a-d*, FIG. 1), manage the receipt of data and status requests from the bus controller 102 and the transmission of responses by the main RT 202 and its associated redundant RTs 208*a-n*; all transmissions to the bus controller 102 may appear to be from a single shared remote terminal address. For example, status updates may be handled by one redundant RT 208*a* while subsystem data updates are handled by another redundant RT 208*n* (or by the main RT 202) on a subaddress-by-subaddress basis.

In some embodiments, the adapter device 206 may be implemented and may function similarly to the adapter devices 110, 110*a*, except that the adapter device 206 may be incorporated into the main RT 204. For example, the control processor (112, FIG. 2) and MT (114, FIG. 1) of the adapter device 206 may be integrated in a virtual software "bubble" within the main RT 204. Similarly, the relays (116*a-d*, FIG. 1) of the adapter device 206 (e.g., for control of communications between the bus controller 102, the main RT 204, and its associated redundant RTs 210) may be physically incorporated within the main RT 204.

In some embodiments, the LVC training platform 100 may include one or more main RTs 212 not associated with a redundant or secondary RT. Accordingly, the main RT 212 may not require an adapter device, instead connecting directly to the data bus 104.

Figure 3:
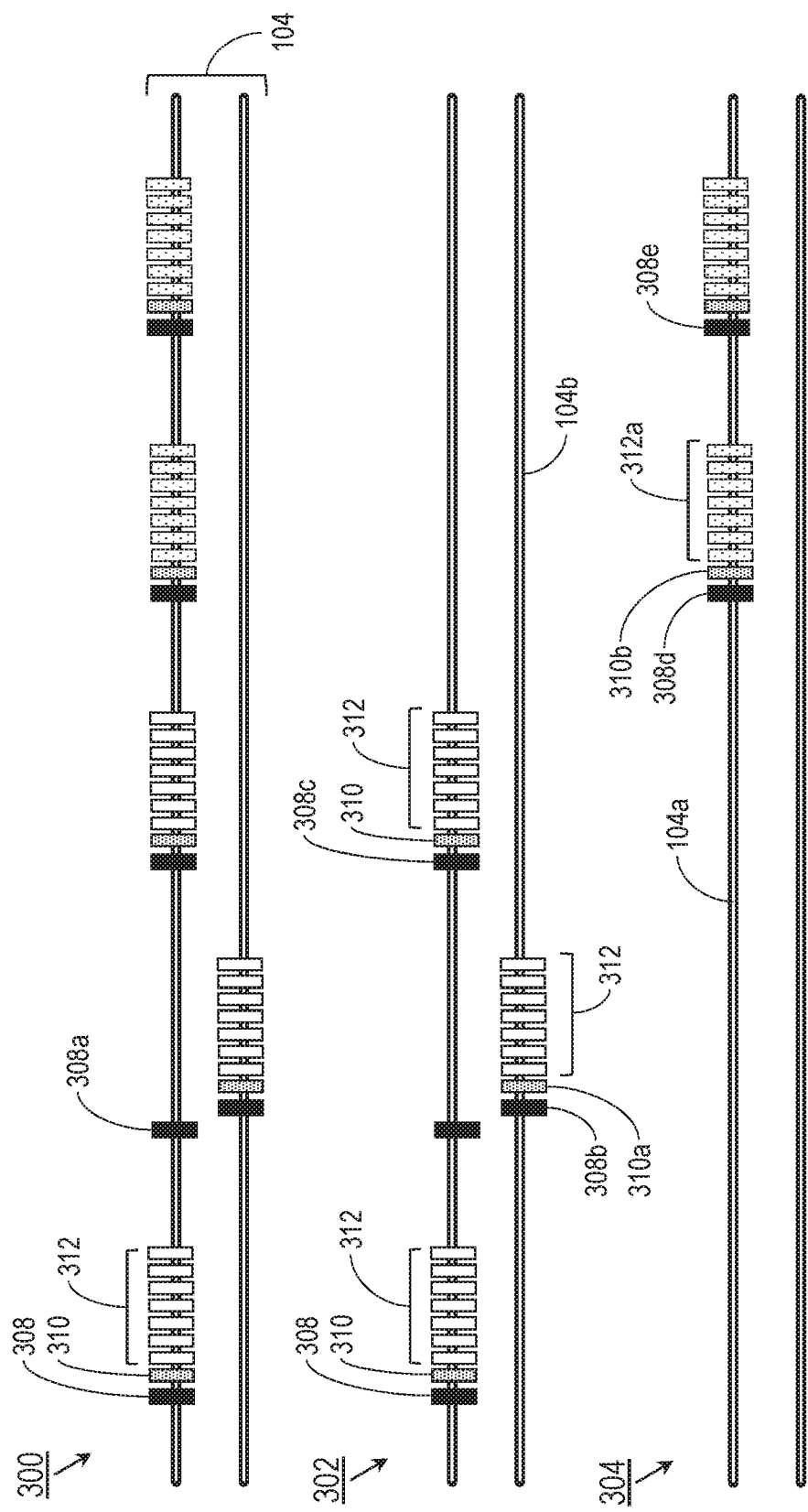
FIG. 3 is a diagrammatic illustration of operations of the LVC training platform of FIG. 1.

Referring to FIG. 3, the data bus 104 of the LVC training system 100 of FIG. 1 is shown. In embodiments, message traffic between the bus controller (102, FIG. 1), the main/primary RT (106, FIG. 1), and the redundant/secondary RT (108, FIG. 1) may be seen differently by the bus controller (300), by the main RT (302), and by the redundant RT (304).

For example, the bus controller 102 may transmit command words (308) via the primary bus 104*a* to request data from the main RT 106, to which the main RT may respond with a status update (310) followed by the requested subsystem data (312). When the next command word (308*a*) is transmitted, the adapter device (110, FIG. 1) may have disconnected the main RT 106 from the primary bus 104*a*, but the redundant RT 108 may not respond with a status update; accordingly, the command word may be repeated (308*b*) on the secondary bus 104*b* to prevent data loss, to which the main RT may respond with a status update 310*a* and subsystem data 312. The bus controller 102 may return to the primary bus 104*a* for the next command word (308*c*) to which the main RT 106 may respond appropriately (status update 310, subsystem data 312).

When the next command word (308*d*) is transmitted via the primary bus 104*a*, the adapter device 110 may have again disconnected the main RT 106 from the primary bus (as noted above, this may occur on a cyclical or periodic basis), although this time the redundant RT 108, anticipating the disconnection, "takes over" the connection and is connected to the primary bus 104*a* by the adapter device. The redundant RT 108 may then transmit its own status word (310*b*) and subsystem data (312*a*) in response to the command word 308*d*. The redundant RT 108 may continue to respond to subsequent command words (308*e*) from the bus controller 102, e.g., until the main RT 106 "takes over" the connection for itself.

Figure 4:
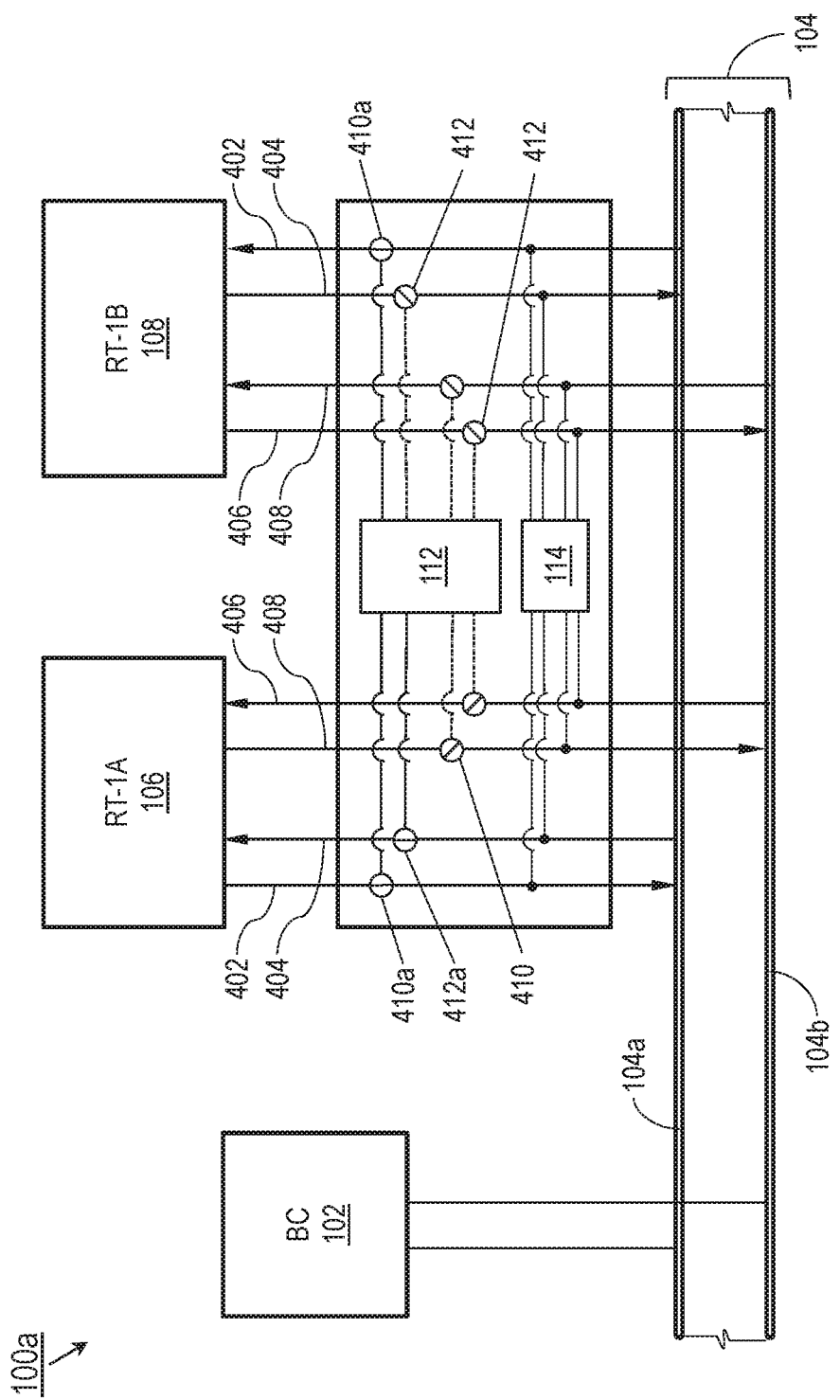
FIG. 4 is a block diagram illustrating the LVC training platform of FIG. 1.

Referring to FIG. 4, an LVC training system 100*a* is shown. In embodiments, the LVC training system 100*a* may be implemented and may function similarly to the LVC training system 100 of FIGS. 1-3, except that the LVC training system 100*a* may separate transmission (Tx) and reception (Rx) functionalities by incorporating Tx lines 402, 404 for the transmission of data and status messages from the main RT 106 and redundant RT 108 to, respectively, the primary bus 104*a* and the secondary bus 104*b* and, independent of the Tx lines, Rx lines 406, 408 for the reception of data and status messages from respectively the primary bus and secondary bus.

In embodiments, the adapter device 110 may incorporate separate transmitter relays 410 and receiver relays 412, the transmitter relays controlling access to the data bus 104 via the Tx lines 402, 404 and the receiver relays controlling access to the data bus via the Rx lines 406, 408. The adapter device 110 may manage the activation and deactivation of transmitter relays 410 and receiver relays 412 such that, for example, the redundant RT 108 may "see" (e.g., have access to) data or status requests from the bus controller 102 to the main RT 106 via the primary bus 104*a* (via active receiver relays 412*a*) although the primary bus may not receive responses from the redundant RT 108 (e.g., the transmitter relay 410 between the primary bus and the redundant RT may be inactive while the transmitter relay 410*a* between the primary bus and the main RT is active).

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

I claim:

1. A remote terminal adapter device, comprising:
at least one processor communicatively coupled to a bus controller by a dual redundant data bus having a primary data channel and a secondary data channel;
a monitor terminal communicatively coupled to the at least one processor, the monitor terminal configured to:
monitor message traffic associated with the data bus; and
identify message traffic associated with at least one of:
a first remote terminal associated with a remote terminal address;
or
at least one second remote terminal configured to serve as a redundant remote terminal to the first remote terminal;
a first relay set communicatively coupling the data bus to the first remote terminal;
and
at least one or more second relay set, each second relay set communicatively coupling the data bus to a second remote terminal;
the at least one processor configured to provide access to the data bus for the at least one second remote terminal via the remote terminal address based on the message traffic identified by the monitor terminal by deactivating the first relay set and activating the corresponding second relay set.

2. The remote terminal adapter device of claim 1, wherein:
the first remote terminal corresponds to a subsystem of a mobile platform;
and
the at least one second remote terminal is configured to simulate the subsystem.

3. The remote terminal adapter device of claim 1, wherein the at least one processor is configured to provide access to the data bus for the at least one second remote terminal based on a request received from the second remote terminal.

4. The remote terminal adapter device of claim 1, wherein the at least one processor is configured to:
determine a type of the received message; and
provide access to the data bus for the at least one second remote terminal based on the determined message type.

5. The remote terminal adapter device of claim 4, wherein the message type is a first message type, and the at least one processor is configured to:
based on a first message type, deactivate the first relay and activate the second relay;
and
based on a second message type, deactivate the second relay and activate the first relay.

6. The remote terminal adapter device of claim 1, wherein the at least one processor is configured to:
when no message is received from the second remote terminal via the primary data channel, reconnect the first remote terminal to the secondary data channel by activating the first relay.

7. The remote terminal adapter device of claim 1, wherein:
the first relay comprises a) a first transmission relay communicatively coupling the data bus to a first transmission channel of the first remote terminal and b) a first reception relay communicatively coupling the data bus to a first reception channel of the first remote terminal;
and
each second relay comprises a) a second transmission relay communicatively coupling the data bus to a second transmission channel of the second remote terminal and b) a second reception relay communicatively coupling the data bus to a second reception channel of the second remote terminal.

8. The remote terminal adapter of claim 1, wherein the first relay set and the one or more second relay sets are analog relay sets.

9. A training platform, comprising:
a bus controller;
a dual redundant data bus communicatively coupled to the bus controller, the data bus having at least a primary data channel and a secondary data channel;
at least one primary remote terminal, each primary remote terminal associated with an adapter device and with a remote terminal address;
at least one secondary remote terminal, each secondary remote terminal corresponding to a primary remote terminal and configured to serve as a redundant remote terminal thereto;
each adapter device communicatively coupling the primary remote terminal and its corresponding secondary remote terminals to the data bus, each adapter device comprising:
at least one processor;
at least one first relay set communicatively coupling the data bus to the primary remote terminal;
at least one second relay set, each second relay set communicatively coupling the data bus to the corresponding secondary remote terminal;
and
a monitor terminal configured to:
monitor message traffic associated with the data bus; and
identify message traffic associated with one or more of the at least one primary remote terminal and the at least one secondary remote terminal;
the at least one processor configured to provide access to the data bus for the at least one secondary remote terminal via the remote terminal address based on the message traffic identified by the monitor terminal by deactivating the first relay set and activating the corresponding second relay set.

10. The training platform of claim 9, wherein:
the primary remote terminal corresponds to a subsystem of a mobile platform;
and
the corresponding secondary remote terminal is configured to simulate the subsystem.

11. The training platform of claim 10, wherein the mobile platform includes at least one of an aircraft, a ground-based vehicle, or a maritime vehicle.

12. The training platform of claim 9, wherein the at least one processor is configured to provide access to the data bus for the at least one secondary remote terminal based on a request received from the secondary remote terminal.

13. The training platform of claim 9, wherein the at least one processor is configured to:
   when no message is received from the secondary remote terminal via the primary data channel, reconnect the primary remote terminal to the secondary data channel by activating the first relay set.

14. The training platform of claim 9, wherein the first relay set and the one or more second relay sets are analog relay sets.

* * * * *